(12) United States Patent
Denslow (10) Patent No.: US 7,921,538 B2
(45) Date of Patent: Apr. 12, 2011

(54) ALIGNER FOR USE WITH A STAKED FASTENER

(76) Inventor: Clark A. Denslow, Madison, CT (US)

( * ) Notice: Subject to any disclaimer, the term of this patent is extended or adjusted under 35 U.S.C. 154(b) by 1318 days.

(21) Appl. No.: 11/443,767

(22) Filed: May 31, 2006

(65) Prior Publication Data

US 2007/0283547 A1    Dec. 13, 2007

(51) Int. Cl.
*B21D 39/00*    (2006.01)
*B23P 11/00*    (2006.01)

(52) U.S. Cl. ........ 29/509; 29/243.517; 29/271; 29/34 B; 29/464; 29/524.1; 411/501; 411/358; 411/361; 470/28; 470/191; 470/205; 470/207; 72/370.07; 72/370.1; 72/370.11; 72/466.4

(58) Field of Classification Search ............... 29/243.53, 29/509, 243.517, 271, 280, 282, 34 B, 464–468, 29/512, 524.1, 252.06; 411/501, 504, 506, 411/358, 361, 520; 470/191, 28, 31, 205, 207; 72/370.07, 466.4, 466.5

See application file for complete search history.

(56) References Cited

U.S. PATENT DOCUMENTS

| | | | | |
|---|---|---|---|---|
| 3,934,330 A | * | 1/1976 | Briles | 29/509 |
| 4,059,980 A | * | 11/1977 | Nance | 29/566.1 |
| 4,815,193 A | * | 3/1989 | Gutnik | 29/509 |
| 5,177,861 A | * | 1/1993 | Sawdon | 29/798 |
| 5,531,009 A | * | 7/1996 | Givler | 29/243.53 |
| 6,161,273 A | * | 12/2000 | Rivera et al. | 29/525.06 |
| 2002/0125297 A1 | * | 9/2002 | Stol et al. | 228/112.1 |
| 2005/0120532 A1 | * | 6/2005 | Mauermann et al. | 29/428 |

* cited by examiner

*Primary Examiner* — A. Dexter Tugbang
*Assistant Examiner* — Jeffrey Carley
(74) *Attorney, Agent, or Firm* — William B. Gowanlock (57) ABSTRACT

An aligner and a method for its use in staking a fastener. More specifically, the aligner guides a tip of a staking tool in some portion of a staking operation properly into alignment with a clinch portion of a staked fastener. As a result, the clinch portion is shaped into a head of a generally higher quality than would otherwise occur.

16 Claims, 10 Drawing Sheets

ALIGNER FOR USE WITH A STAKED FASTENER

FIELD OF THE INVENTION

The present invention relates generally to a staked fastener and more specifically to an aligner for use with a staked fastener having a shank to create a head thereon so that across numerous staking operations the heads are more consistently aligned with the shanks.

BACKGROUND

Staked fasteners are used in numerous applications, such as securing multiple pieces of sheet material and mounting devices on boards. Common staked fasteners include rivets and posts.

All staked fasteners function by having a clinch portion that is staked in a staking operation. In the case of a typical rivet, the rivet prior to the staking operation generally has a head and a shank having a grip portion and a clinch portion. In an application where a material combination, e.g., two pieces of sheet material, is being secured together, the rivet is inserted into aligned holes, one in each piece of sheet material, such that the head is on one side of the material combination, the grip portion is in the holes, and the clinch portion is projecting outwardly from the other side of the material combination. The clinch portion is then staked in a staking operation to form a head, thereby trapping the material combination between the two heads.

Staking of the clinch portion can be accomplished using numerous methods, and the choice of method depends on the material from which the clinch portion of the rivet is made. That said, the quality of the staking operation determines the quality of the head formed thereby. As the staking operation defines the quality of the head, it also defines the final mechanical properties of the completed staked fastener.

Ideally, in a staking operation, the clinch portion is shaped into a head such that loads acting on the created head are properly transferred into the grip portion. For example, when a circular head is created on a circular grip portion, it is important that the centerlines of each align. It should be appreciated that misalignment would tend to permit a torque couple that could cause a failure of the staked fastener.

Where staking of several staked fasteners is performed employing hand-held tools, variations in the quality of the formed heads are particularly problematic. When a hand-held tool is used, it is the skill of the operator of the tool that determines the quality of the head. This is particularly true where the staked fastener, or at least the clinch portion, is made from a plastic and the staking method employed involves melting the plastic, such as when the staking operation employs ultrasonics. When melting of the staked portion is employed, the operator of a hand-held tool must assure that during setup of the tool, the tool is properly centered on the clinch portion, and then during the staking operation the tool is forced down along the axis of the clinch portion.

As anyone who has ever worked with a process involving the shaping of plastic by melting with hand tools will attest, there is a significant amount of skill required to achieve a proper result. The process is at best problematic when the plastic is being formed on a horizontal, flat surface, and gravity is acting in the appropriate direction. The complexity only increases when any of these conditions is not present. However, and almost more importantly, a high degree of repeatability or uniformity regardless of conditions across numerous units is all but impossible.

In the case of a staked fastener, this process is further complicated where the staked fastener employs a supplemental material. Supplemental material is a second material applied around the clinch portion of the fastener prior to performing the staking operation, and it becomes part of the fastener. In some cases, the supplemental material will also be melted during the staking operation, which increases the skill required of a hand tool operator to make repeatable, high-quality fasteners.

What is needed in the art is a better way of employing hand tools to stake a staked fastener. More specifically, the art needs a better way of staking a staked fastener where the staking operation involves flowing, e.g., melting, of the clinch portion to increase the consistency of the staking result across multiple staking operations.

SUMMARY OF THE INVENTION

This invention is an aligner and a method for its use in staking a staked fastener to form a head. More specifically, the aligner defines a channel into which a tip of a staking tool is placed. Then as the tip travels through the channel during a staking operation, the channel guides the staking tool into alignment with the relevant portion of the staked fastener to allow an optimum head to be formed.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

DETAILED DESCRIPTION

Figure 1:
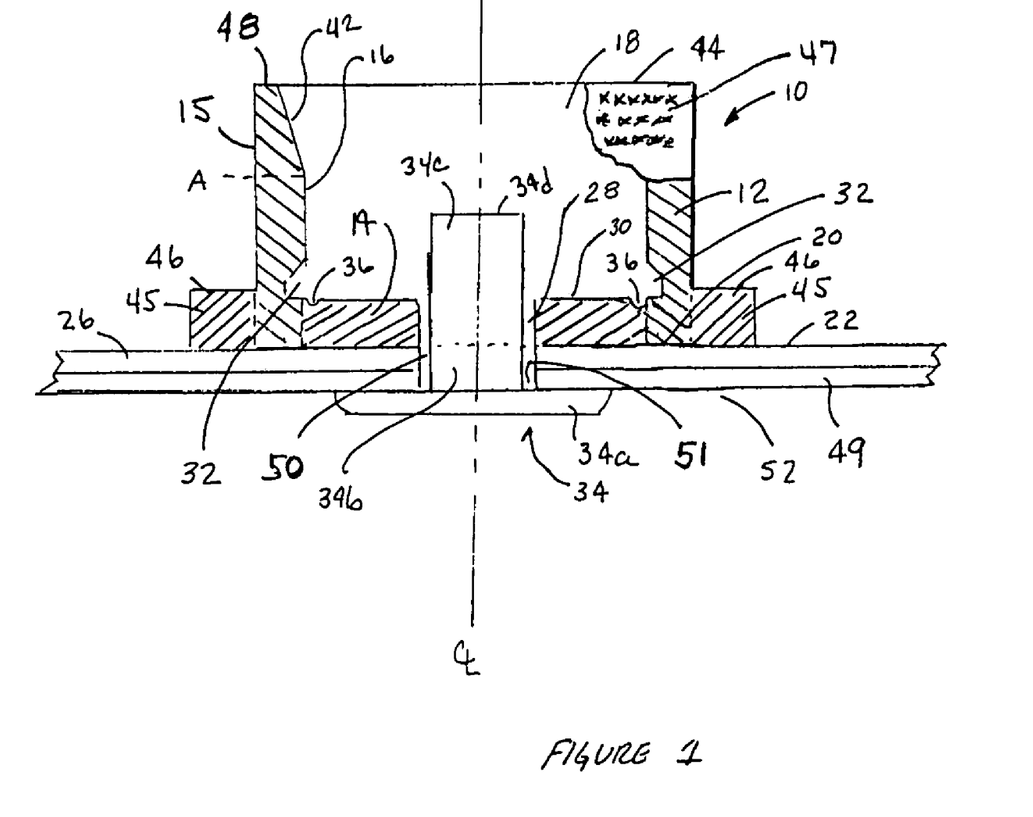
FIG. 1 is a cross-sectional view of the aligner with a rivet (a type of staked fastener) to be staked placed therein.
Figure 2:
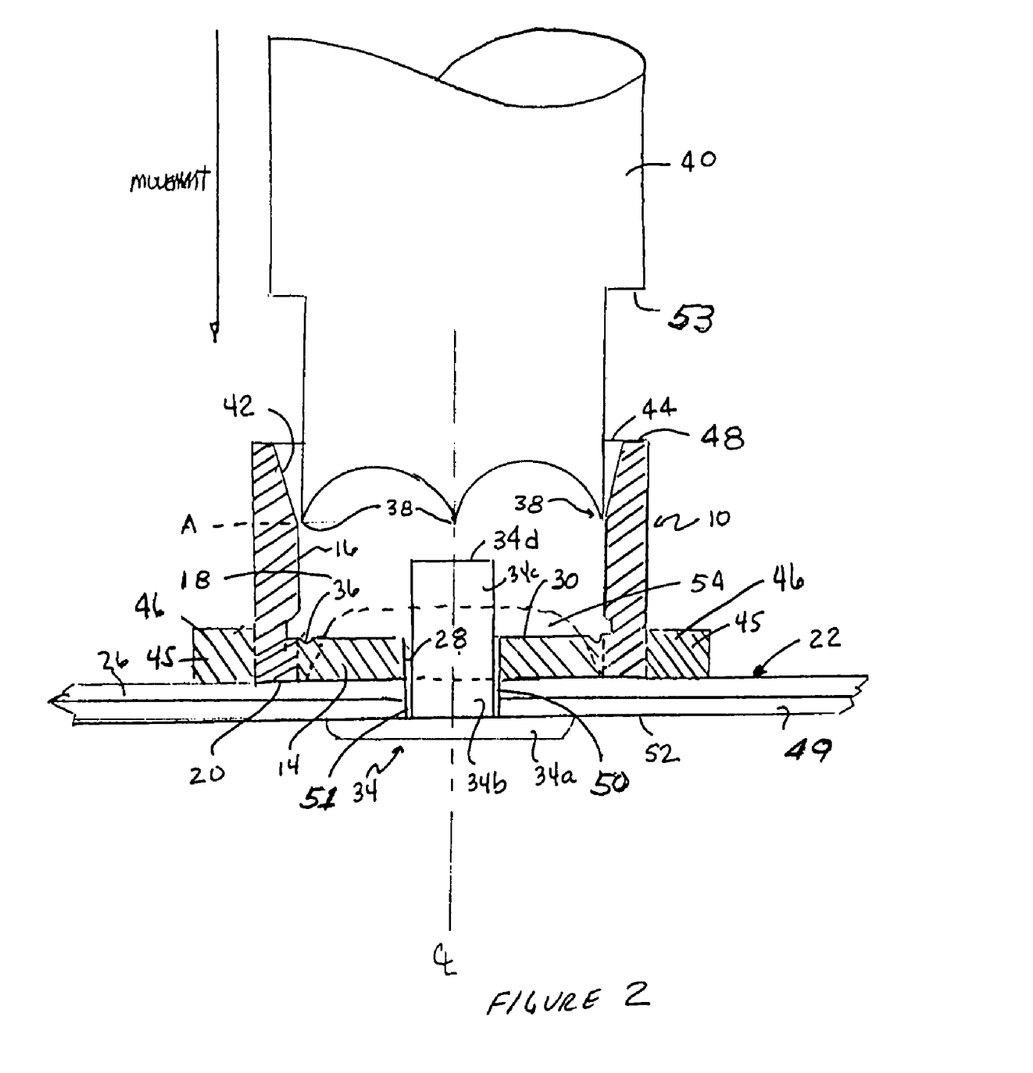
FIG. 2 is the cross-sectional view of the aligner of FIG. 1 with a staking tool positioned therein.

As shown in FIGS. 1 and 2, an aligner, generally referred to by reference number 10, for use in a staking operation of a staked fastener includes a housing 12 and a base 14 (demarcation from housing identified by dotted lines). As explained below when the aligner 10 is used in a staking operation, the base 14 is disassociated from the housing 12. The housing 12 has an exterior surface 15, an interior surface 16 that defines a channel 18, and a bottom 20. The base 14 is positioned in the channel 18. When the aligner 10 is in use, the bottom 20 of the aligner 10 may be placed upon an exposed surface 22 of a material 26. The base 14 defines a through bore 28 and has a channel surface 30.

The point of demarcation between the housing 12 and the base 14 is illustrated by a dotted line, because the structure of the demarcation depends in part upon how the aligner 10 is manufactured. For example, if the aligner 10 is made in a single process (e.g., injection molding), the housing 12 and the base 14 could be one piece. Thus, the demarcation could be continuous in whole, or part, and therefore might only be discernable after the aligner 10 is used. In the case where the aligner 10 was formed it two pieces, a housing 12 and a base 14, the base could be friction fit or otherwise attached (e.g. adhered) within the housing. This would mean that there is a high probability that the base 14 could be visually identifiable from the housing 12, thus the point of demarcation would be identifiable. Generally, a friction fit would create a discontinuity between the housing 12 and the base 14. Adhering the base 14 within the housing 12 may, or may not, create a discernable demarcation.

The aligner 10 may also incorporate a flash trap 32. The flash trap 32 accepts excess material that is generated because of the staking operation of a staked fastener, such as a rivet (generally referred to by reference number 34), which is explained in greater detail below.

The base 14 of the aligner 10 also may incorporate a depression 36. The depression 36, which is in the channel surface 30, may extend around the entire base 14. Referring to FIG. 2, the depression 36 is placed to cooperate with the relevant parts of a tip 38 of a staking tool 40 so that the base 14 may be more easily disassociated from the housing 12 during a staking operation.

Further depending upon the type of staking method employed, the depression's 36 placement and depth may also assist in energy distribution from the tip 38 to a clinch portion 34*c* of the rivet 34, and base 14, if applicable. More specifically, where ultrasonics is the staking method, the staking tool 40 employs a horn. The energy that melts the clinch portion 34*c* and the base 14, if applicable, is at the end of the horn. Thus, where the end of the horn might otherwise contact the base 14 without contacting the clinch portion 34*c* but for the depression 36, the depression permits the end of the horn to simultaneously, or nearly simultaneously, contact the base and the clinch portion.

Referring to FIG. 2, the depicted tip 38 is a standard profile, but other tips, such as dome, knurled, flushed, hollow or inverse, could be used. Where the tip 38 has an outer ridge, such as with a standard profile, the depression 36 is proximate the intersection of the channel surface 30 of the base 14 and the interior surface 16 that defines the channel 18.

Continuing with FIGS. 1 and 2, the interior surface 16 of the aligner 10 may also define a chamfer 42. The chamfer 42 is located at an entrance 44 defined by the housing 12 of the aligner 10. As shown in FIG. 2, the chamfer 42 assists in guiding the tip 38 into the channel 18 during a staking operation.

Additionally, the aligner 10 may also incorporate a hold-down 45, such as cooperating appendages 46 extending outwardly from the housing 12. The hold-down 45 can be continuous around the housing 12 or be formed of individual protrusions. The hold-down 45 may be employed by a user of the aligner 10 to assist in holding the aligner against the exposed surface 22 during a staking operation.

Referring to FIG. 1, the aligner 10 may also incorporate a grasp 47 for assisting in holding on to the aligner. The grasp 47 is positioned on the exterior surface 15. The grasp 47 is illustrated as knurling, but other structures such as protrusions or indentations, or combinations of structures may be used. The grasp 47 may be positioned proximate an opposing surface 48 of the aligner 10.

In an exemplary use, a staked fastener such as the rivet 34, which in addition to the clinch portion 34*c* includes a head 34*a* and a grip portion 34*b*, is used to secure the material 26 to another material 49. The material 26 defines a hole 50 and the other material 49 defines another hole 51. The hole 50 and the other hole 51, which each have a cross-section suitable for the relevant portions of the rivet 34 placed therein and therethrough, are aligned and the rivet 34 is positioned therethrough. Positioning of the rivet 34 in the holes 50, 51 results in the head 34*a* on one side 52 of the material combination 26, 49, the grip portion 34*b* in the material 26, 49, and the clinch portion 34*c* projecting outwardly from the exposed surface 22.

The precise demarcation between the grip portion 34*b* and the clinch portion 34*c* of the river 34 depends in large part upon how the base 14 is finally incorporated into the completed staked fastener. As discussed below, if the base 14 and clinch portion 34*c* become unified to some degree as a result of the staking operation, it might be argued that the grip portion 34*c* ends at the exposed surface 22; if not at the channel surface 30. Generally, the grip portion 34*c* is that portion of a rivet 34 that is not reshaped during the staking operation. The precise demarcation point is generally not an issue as rivets 34 are homogenous. Where this is not the case, the precise demarcation point is application dependent.

Continuing with FIGS. 1 and 2, the aligner 10 is positioned about the clinch portion 34*c*. More specifically, the bore 28 in the base 14 has a cross-section suitable for permitting at least some of the grip portion 34*c* of the rivet 34 to enter into the channel 18. Ideally, the end 34*d* of the grip portion 34*c* will not extend out of the channel 18. It should be appreciated that the aligner 10 and the rivet 34 each have a centerline. Depending upon the application, the placing of the rivet 34 in the aligner 10 may align these centerlines.

Referring to FIG. 2, to stake the clinch portion 34*c*, the tip 38 of the staking tool 40 is positioned within the channel 18. Positioning of the tip 38 in the channel 18 may be assisted by the chamfer 42 defined by the housing 12 at the entrance 44. If it is desired to have the tip 38 aligned with the clinch portion 34*c* before the tip contacts the clinch portion, the chamfer 42 will have to end at a point "A" within the channel 18, which is above the end 34*d* of the rivet 34.

When the tip 38 enters the channel 18, the channel is appropriately dimensioned to align eventually the tip with the grip portion 34*c* of the rivet 34. Depending upon the application, this alignment may involve aligning the tip's 38 centerline with the centerline of the channel 18 and/or rivet 34. This embodiment shows a tip 38, which is cylindrical, entering the channel 18 and encountering after the chamfer 42 a complimentary cylindrical portion. As the cylindrical portion of the interior surface 16 of the aligner 10 extends down to the base 14, alignment of the tip 38 and the grip portion 34*c* of the rivet 34 is maintained throughout the staking operation.

Continuing with FIG. 2, as should be readily appreciated, the base 14, as a result of the staking of the clinch portion 34*c*, will be trapped between a head 54 (shown in dotted lines) being formed and the exposed surface 22 of the material 26. It should be appreciated that if the centerlines of the aligner 10, rivet 34, and tip 38 are all aligned, the head 54 should have a centerline that is aligned with these centerlines. As a result, the base 14 will become a part of the finished rivet. During the staking operation, the tip 38 will inevitably encounter the base 14 and the base must be disassociated from the housing 12 to permit the housing 12 to be removed to complete the staking operation.

How the base 14 ultimately is disassociated from the housing 12 is generally a function of the interaction of the base 14 with the clinch portion 34c during the staking operation. The interaction of the base 14 with the clinch portion 34c during a staking operation is dependent upon the materials from which the base and clinch portion are made and the staking method used.

For example and as illustrated in FIG. 2, if the base 14 and the clinch portion 34c are made of the same, or compatible, plastic, and an ultrasonic staking method is used, it might be possible to melt both the clinch portion and the base together, even to the point where after the staking operation they are indistinguishable one from the other. Thus, the base 14 could be disassociated from the housing 12 by the staking tool 40 as it reaches the exposed surface 22, which would be part of the staking operation. More specifically as to the use of ultrasonics, the horn could cut the base 14 away from the housing 12 at the point of demarcation.

In another example (not depicted), if the base 14 was made from a metal unaffected by the staking operation (e.g., heat staking), and the clinch portion 34c was made from a plastic, and the staking operation relied on melting the clinch portion, the head 54 would be formed when the staking tool 40 reaches the channel surface 30 of the base 14. Thus, the base 14 effectively would be unchanged and trapped in position by the head 54. The housing 12 would be removed by pulling the housing from the base 14, which, depending upon the method of construction of the aligner 10, may be by breaking any connection between the housing and base. These two examples represent extremes, and it should be appreciated that other material combinations in conjunction with other staking methods could produce an entire spectrum of outcomes.

The staking operation in all likelihood will generate flash (not shown), excess material, generally from the clinch portion 34c, that is not part of the finished head. If a flash trap 32 is present, some flash should enter the trap. In any event, it should be contemplated that flash will be within the channel 18. Thus, the cross-section of channel 18 relevant to the cross-section of the tip 38 should have a tolerance suitable to permit the anticipated flash so the tip will not bind in the channel throughout the duration of the staking operation, including extraction of the tip.

Referring to FIG. 2, as an option the staking tool 40 may incorporate a stop 53. The stop 53 is located on the staking tool 40 such that the stop abuts the opposing surface 48 of the aligner 10 coincidently with the tip 38 completing its maximum movement in the channel 18 during the staking operation.

It is important that the cross-section of the housing 12 at least generally maintain its shape during the staking operation. Thus, the material for the housing 12 must be selected based on the type of staking method (e.g., ultrasonic, or hot air/cold stake) to be performed. The housing's 12 cross-section after the completion of the staking operation has a considerable influence on the final shape and location of the formed head 54.

Figure 3:
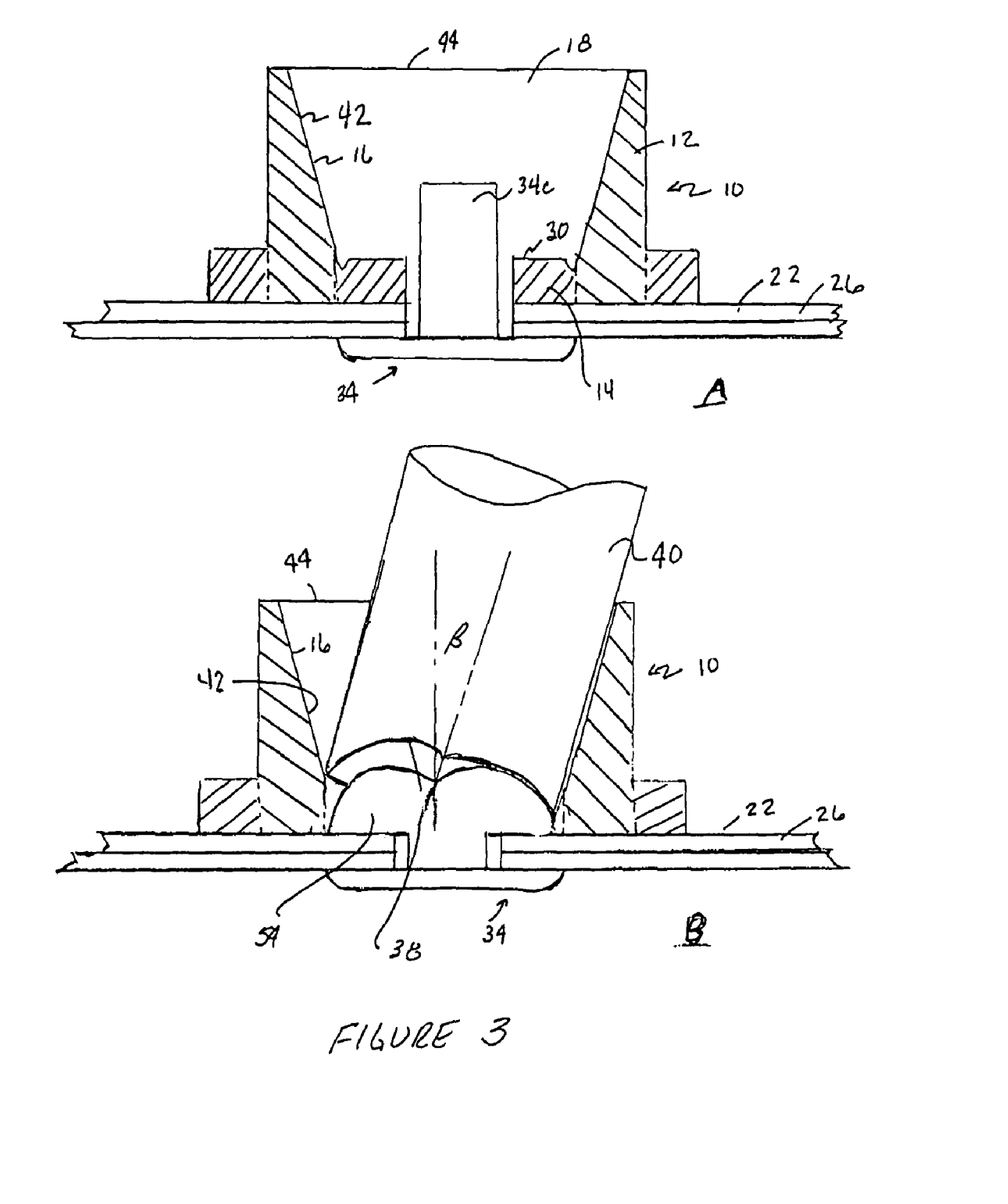
FIG. 3 is a cross-sectional view of the aligner of FIG. 1 incorporating structure that permits wobbling of a tool positioned therein.

As shown in FIG. 3A, the chamfer 42 on the interior surface 16 of the housing 12 of the aligner 10 may define a channel 18 having tapering sides, such as a frustum of a cone. The tapering sides begin at the entrance 44 of the aligner 10 and extend to the channel surface 30 of the base 14. The interior surface 16 proximate the base 14 should define a cross section that aligns the tip 38 (see FIG. 2) with the clinch portion 34c of the rivet 34. While the tapering sides of the interior surface 16 have been shown as regular, this need not be the case.

As shown in FIGS. 3A and 3B during a staking operation, the tip 38 of a staking tool 40 is inserted into the aligner 10 and guided by the channel 18 into alignment with the clinch portion 34c of the rivet 34. It should be appreciated that when the tip 38 initially contacts the clinch portion 34c (not shown), the tip may not be properly aligned with the clinch portion. However, as the staking operation proceeds with the tip 38 traversing the channel 18, alignment of the tip and clinch portion 34c will improve and will be proper when the tip encounters the channel surface 30 of the base 14. At this point, depending upon how the aligner 10 is constructed, the tip 38 may progress through the base 14 and eventually reach a final position on the exposed surface 22 of the material 26. If the tip 38 does not progress through the base 14, the tip's final position will be on the channel surface 30 (not shown).

After the tip 38 reaches its final position, the tapering sides of the interior surface 16 permit the tip to be wobbled. If during wobbling, the tip 38 remains in contact with the interior surface 16, the tip will be at a constant angle $\beta$ (the angle as shown is exaggerated for clarity) as to the head 54. When the tip 38 is wobbled, the pressure the tip exerts is concentrated in a rotational series of point contacts, thus aiding in cutting off any flash. Therefore, wobbling tends to provide a more finished appearance to the head 54.

Figure 4:
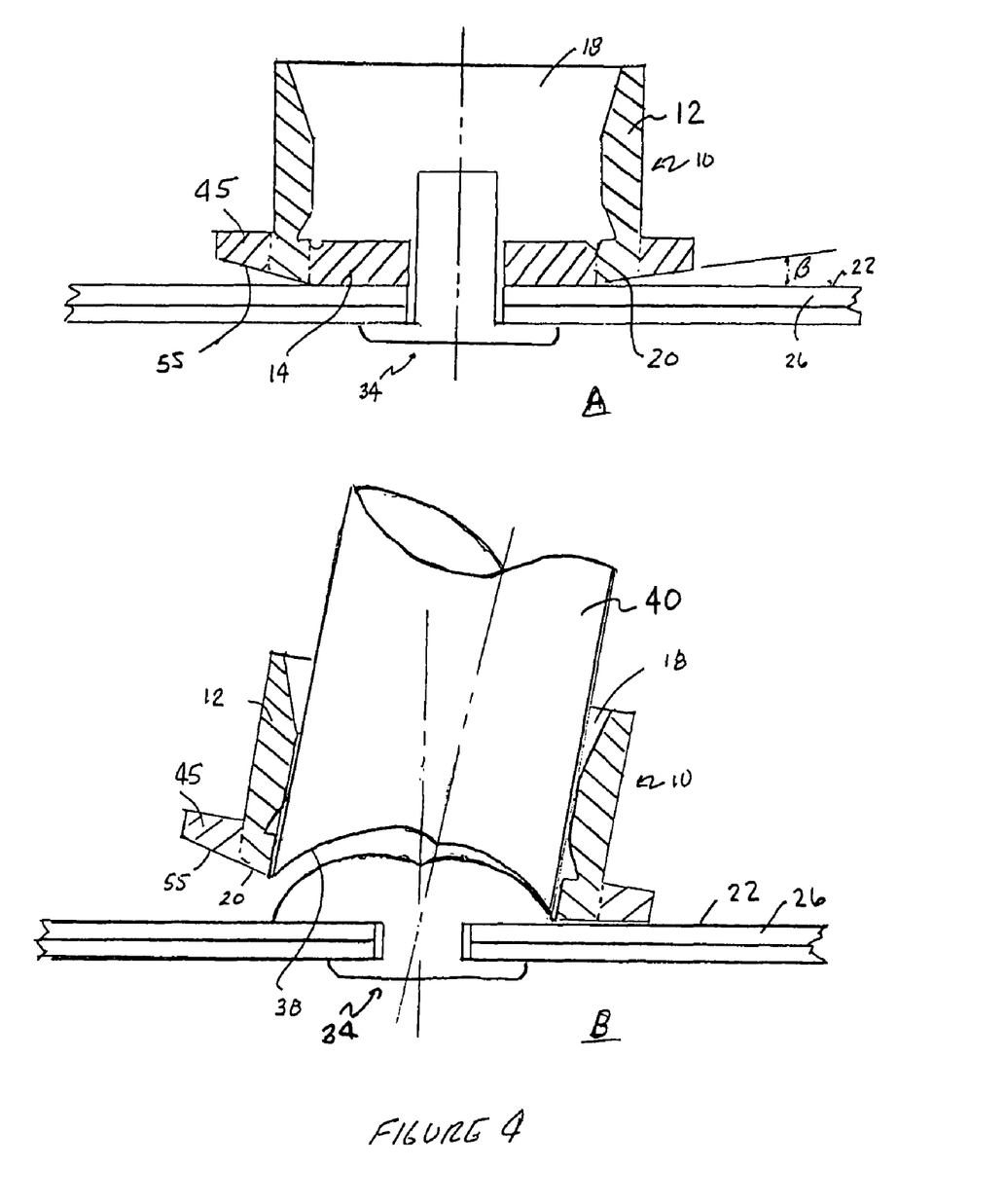
FIG. 4 is a cross-sectional view of the aligner of FIG. 1 incorporating another structure that permits wobbling of a tool positioned therein.
Figure 5A:
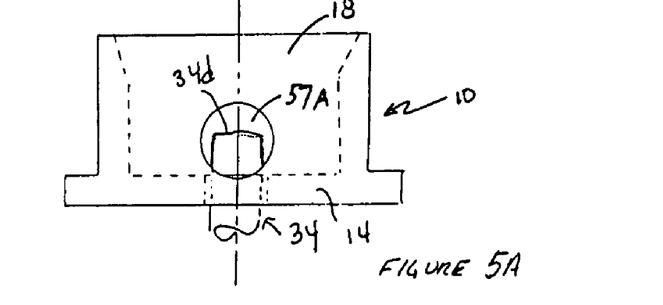
FIG. 5 is a collection of side views of the aligner depicting various observation slit options.
Figure 5B:
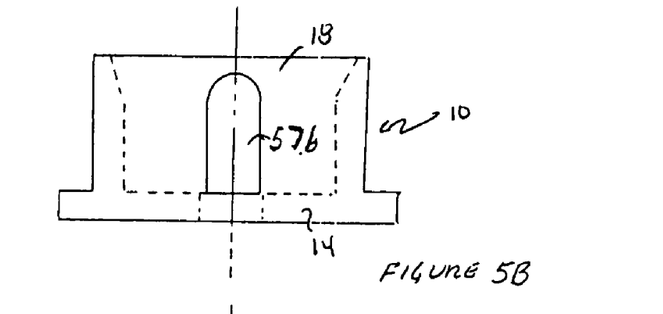
Figure 5C:
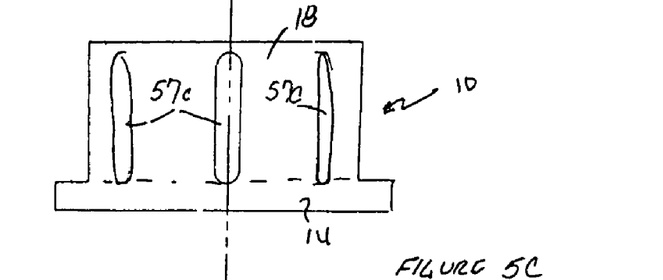
Figure 5D:
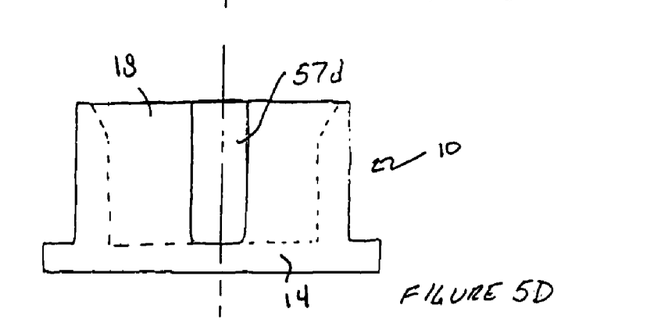

Continuing with FIGS. 4A and 4B, the aligner 10 depicted also permits the tip 38 of the staking tool 40 to be wobbled. As shown in FIG. 4A, the bottom 20 of the housing 12 and a bottom 55 the hold-down 45, if present and desired, is at the angle $\beta$ to the exposed surface 22 of the material 26. As previously discussed, the tip 38 would enter the channel 18 and then reach a final position. After reaching the final position, the tip 38 may be wobbled, with the wobble being controlled by the bottom 20 of the housing 12 and the opposing surface 48 of the hold-down 45, if present. It should be appreciated, that, while the opposing surface 48 of the hold-down 45 has been shown cooperating with the bottom 20 during wobbling of the tip 38, this is not a requirement.

Referring to FIG. 5, the aligner 10 may have an observation slit (general reference 57). The observation slit 57 may be of any shape and there may be one or more. The observation slit 57 is designed to permit viewing of tip 38 (not shown) as it moves down the channel 18 to encounter the end 34d of the rivet 34. The observation slit 57 may also be sufficient to permit viewing of the tip 38 as it encounters the base 14. FIG. 5A shows an observation slit 57a that is circular in cross-section. FIG. 5B, shows an oblong observation slit 57b. FIG. 5C shows multiple oblong observation slits 57c. FIG. 5D shows an oblong observation slit 57d that is open at the opposing surface 48 of the aligner 10.

Figure 6:
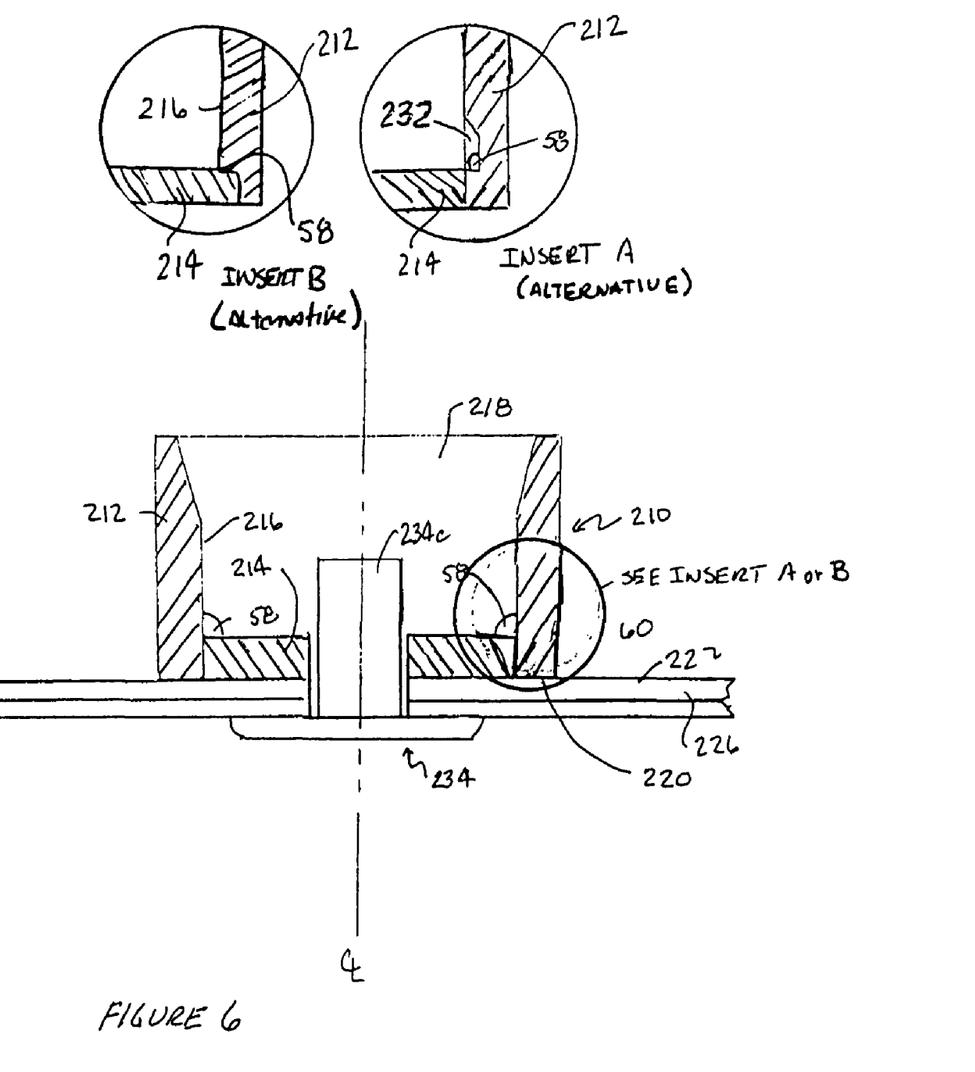
FIG. 6 is a cross-sectional view of a second embodiment of the aligner.

Referring to FIG. 6, the aligner 210 (similar features to the basic invention use the same reference number preceded by a "2") has a stop 58. The stop 58 may be continuous around the interior surface 216, or it may be a series of individual protrusions. The stop 58 is placed in the channel 218, and it creates an abutment 60 for the base 214. This arrangement permits an independent base 214 to be positioned in the channel 218 of the aligner 210 at the proper depth such that the bottom 220 of the housing 212 can still be placed on the exposed surface 222 of the material 226.

This configuration works especially well when the housing 212 and the base 214 are made from different materials. It is also a good configuration when reuse of the housing 212 by repeated insertion of new bases 214 is contemplated. If reuse is contemplated, the staking operation should not remove the stop 58. In this configuration, this might be accomplished by designing the tip (not shown) to not remove the stop 58 during the staking operation.

In an alternative shown in Insert A of FIG. 6, if a flash trap 232 is present, the stop 58 could be recessed therein, thus it should not be in the path of a tip (not shown) as it travels through the channel 218. Referring to FIGS. 2 and 4, the base 14, 214 still must have the proper cross-section so that when it is positioned and held within the channel 18, 218 the alignment function of the base, between the clinch portion 34c, 234c of the rivet 34, 234 and the tip 38 (not shown in FIG. 6), is properly achieved.

In an alternative shown in Insert B of FIG. 6, the stop 58 could be defined by the interior surface 216.

Figure 7:
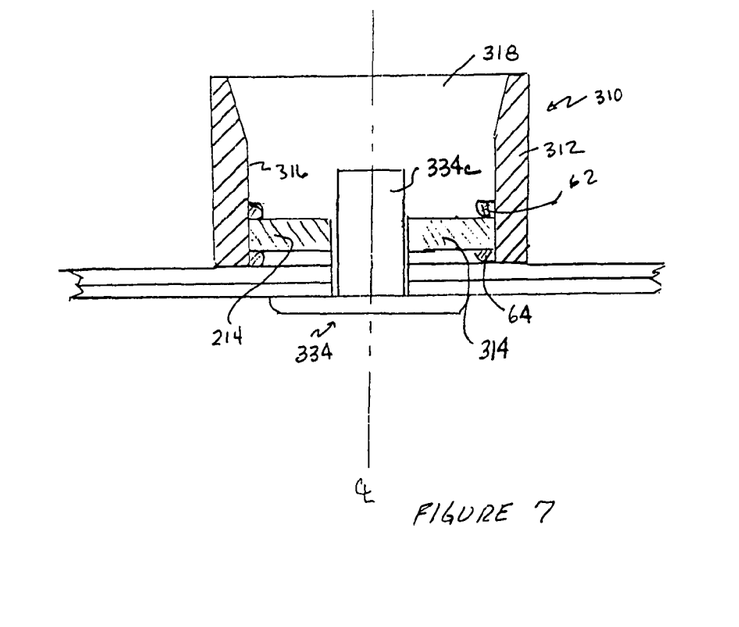
FIG. 7 is a cross-sectional view of a third embodiment of the aligner.

Continuing with FIG. 7, the aligner 310 (similar features to basic invention use the same reference number preceded by the number "3") has both a stop 62 and a keeper 64. The stop 62, and similarly the keeper 64, may be continuous about the side 316 or a cooperating set of protrusion. The stop 62 and keeper 64 cooperate to trap the base 314 therebetween within the channel 318.

This arrangement is particularly desirable where the base 314 and the housing 312 are of different materials, and there is no intention of reusing the housing. As part of the staking operation, the keeper 64 must be removed to allow the base 314 to be released from the housing 312.

As indicated above, the aligner 10 is particularly valuable where the clinch portion 334c of the rivet 334 and the base 314 are both melted during the staking operation, such as in the case of a rivet having a plastic clinch portion and a plastic base that is staked using an ultrasonic hand tool, which employs a horn. The flowing plastic, which is located at the interface of the horn and the rivet, can cause the tip to slip thereby causing the head to be off center, or cause the tip to adopt an angle resulting from the flowing plastic being forced from one side to the other.

The aligner 10 may be even more valuable in the creation of a unified multi-part head. As explained in U.S. patent application Ser. No. 10/955,174, (United States Patent Publication Number 20060067806), which is incorporated herein by reference in its entirety, a unified multi-part head is created using a plastic rivet and a plastic supplemental material wherein the clinch portion and/or the supplemental material contains at least one fiber. In the case of the present invention, the supplemental material equates to the base 14. During the staking operation, the clinch portion and the supplemental material are melted to such a degree that a portion of a fiber in the clinch portion, and/or the supplemental material, migrates into the other. Thus, the resulting clinched rivet has in the head that as formed at least one fiber that has a portion in the original clinch portion and another portion in the original supplemental material.

Creating a unified multi-part head using ultrasonic staking techniques, requires more energy than would otherwise be used if such a result was not required. As those skilled in ultrasonic staking methods will appreciate, the increase in energy increases the time involved to stake a fastener and the fluidity of the material. Both of these factors tend to increase the complexity of the staking operation and lead to increased variations in its outcome, such as heads not properly centered on the grip portion of the rivet.

Figure 8:
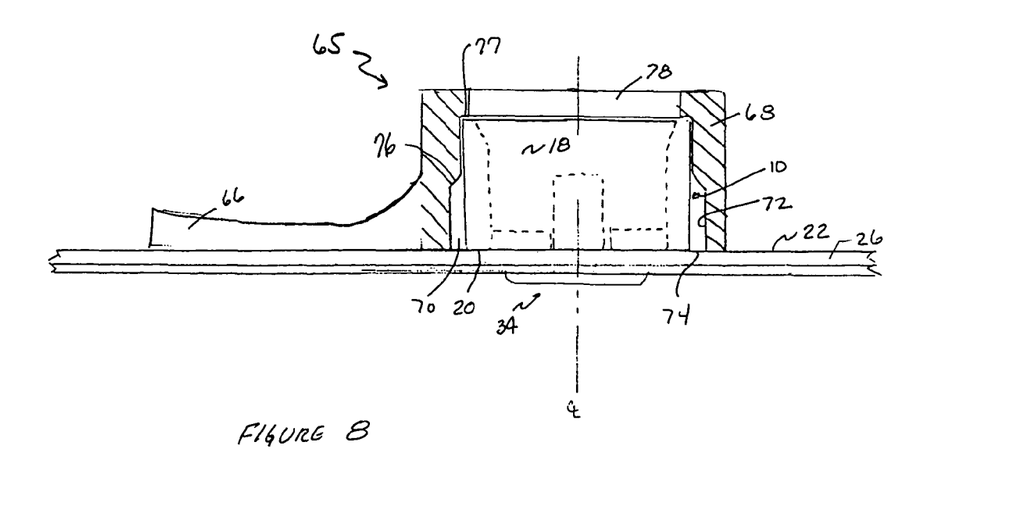
FIG. 8 is a cross-sectional view of a hold-down tool for use with the aligner.

Referring to FIG. 8, the aligner 10 can used in conjunction with a hold-down tool, generally referred to by reference number 65. The hold-down tool 65 has a handle 66 connected to a body 68. The body 68 defines a cavity 70 with a surface 72 dimensioned and shaped to accept the aligner 10 through an opening 74. The surface 72 may define a chamfer 76, which assists in the placement of the aligner 10 in the cavity 70. The surface 72 also defines a stop 77 that positions the aligner 10 in the cavity 70, such that the bottom 20 of the housing 12 is ideally at, but may extend outwardly from, the cavity so that the bottom can contact the exposed surface 22 of the material 26.

The body 68 also defines a passage 78 positioned opposite the opening 74. Referring to FIGS. 2 and 8, the passage 78 is dimensioned to allow the tip 38 of a staking tool 40 to pass through and enter the channel 18 of the aligner 10.

Figure 9:
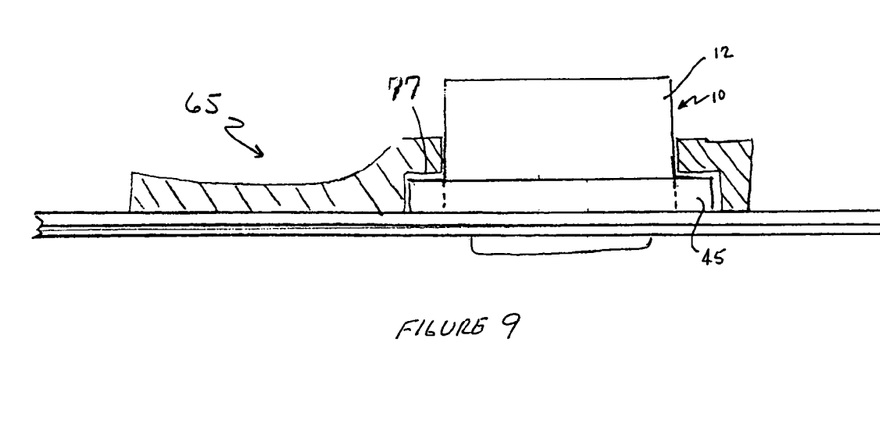
FIG. 9 is a cross-sectional view of another hold-down tool for use with the aligner.

As shown in FIG. 9, where the aligner 10 has a hold-down 45 the stop 77 of the hold-down tool 65 may engage the hold-down instead of the housing 12.

Figure 10:
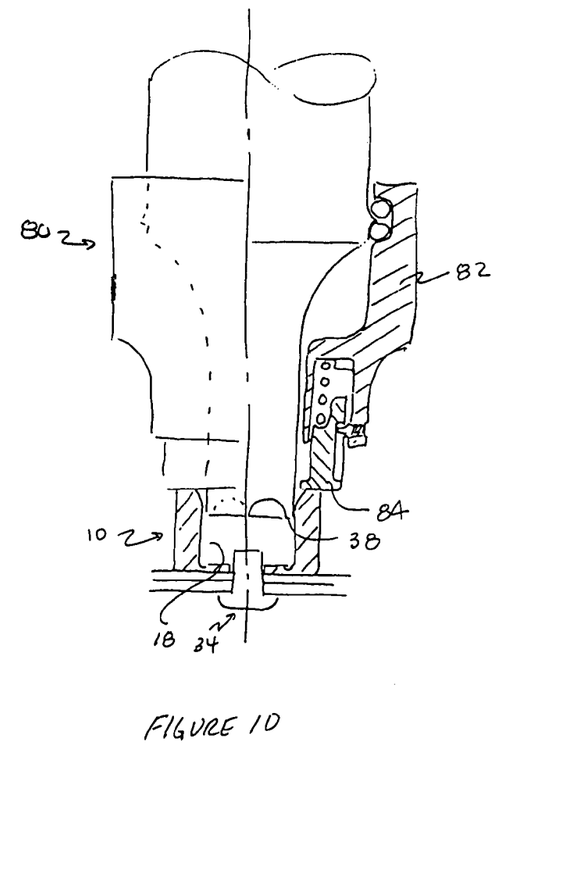
FIG. 10 is a cross-sectional view of another hold-down tool for use with the aligner.

Referring to FIG. 10, the aligner 10 can be used in conjunction with a staking tool (generally referred to by reference number 80) having a hold-down unit 82 affixed thereto at a suitable location. The hold-down unit 82 has a foot 84 that contacts the aligner 10. The foot 84 has a mechanism, such as a spring, that allows the foot to engage the aligner 10 and retract as the tip 38 is advanced down the channel 18 during a staking operation.

Figure 11:
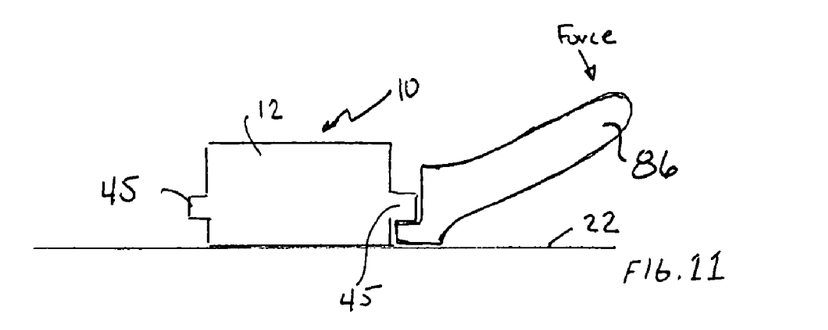
FIG. 11 is a side view of a pry that may be used with the aligner.

Continuing with FIG. 11, the aligner 10 may be used in conjunction with a pry 86 that may assist in separating the base 14 (not shown) from the housing 12. The pry 86 interacts with the hold-down 45, which is shown elevated above the exposed surface 22. In operation, a force is exerted on the pry 86 that causes it to pivot on the exposed surface 22 thereby forcing the hold-down 45, thus the housing 12, away from the exposed surface 22.

Figure 12:
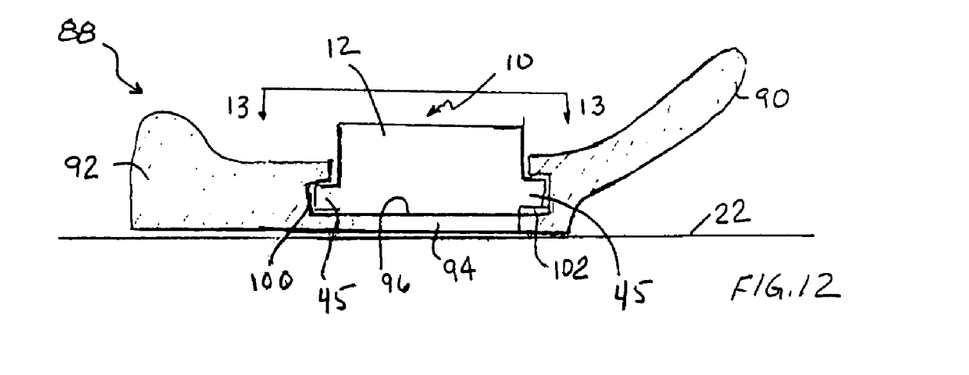
FIG. 12 is a side view of a hold-down tool that incorporates a pry.
Figure 13:
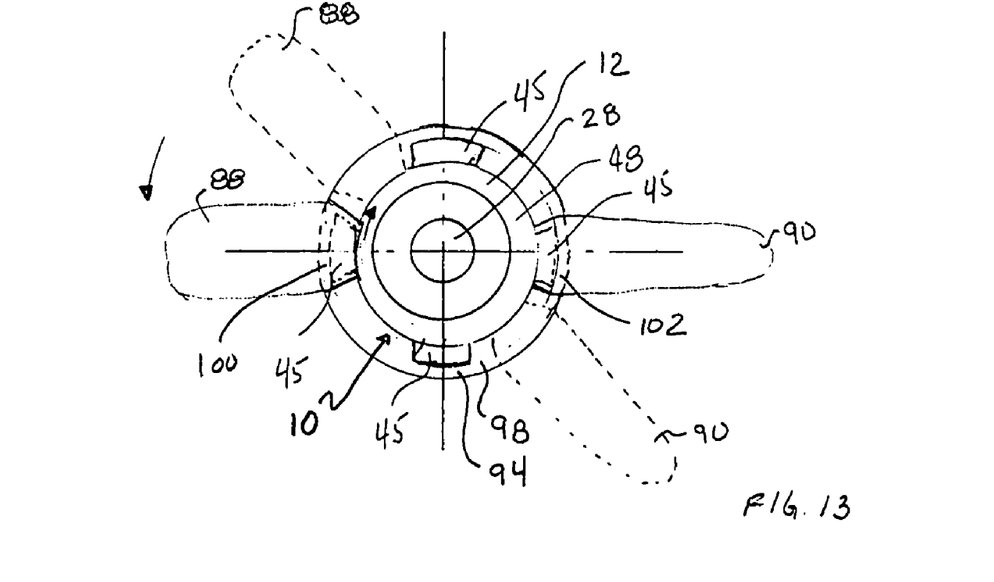
FIG. 13 is a top view of the hold-down tool depicted in FIG. 12.

Referring to FIGS. 12 and 13, a pry may be incorporated into a hold-down tool (generally referred to by reference number 88). In this configuration, the hold-down tool 88 both holds the aligner 10 in contact with the exposed surface 22 and assists in removing the base 14 (not shown) from the housing 12.

As illustrated, the hold-down tool 88 has a pry 90 and a handle 92 connected together by a receptacle 94. The receptacle 94 defines a hole 96 dimensioned to accept an aligner 10.

In use, an aligner 10, which has a hold-down 45 comprised of a plurality of protrusions, is dropped downward (i.e., the bottom 20 of the aligner 10 entering the hole 96 first) into the hold-down tool 88 (see FIG. 13 and dotted hold-down tool). The hold-down 45 rests on a surface 98 of the receptacle 94. The aligner 10 and/or hold-down tool 88 are then moved, in this case rotated, relative one to the other such that a portion of the hold-down 45 enters a notch 100 defined by the handle 92 and another notch 102 defined by the pry 90. The notches 100, 102 may have stops (not shown) therein to assist is proper placement of the hold-down 45.

While the hold-down tool 88 has been illustrated as accepting the aligner 10 by having the aligner dropped therein, those skilled in the art would appreciate that this could be reversed by merely inverting the receptacle 94.

Figure 14:
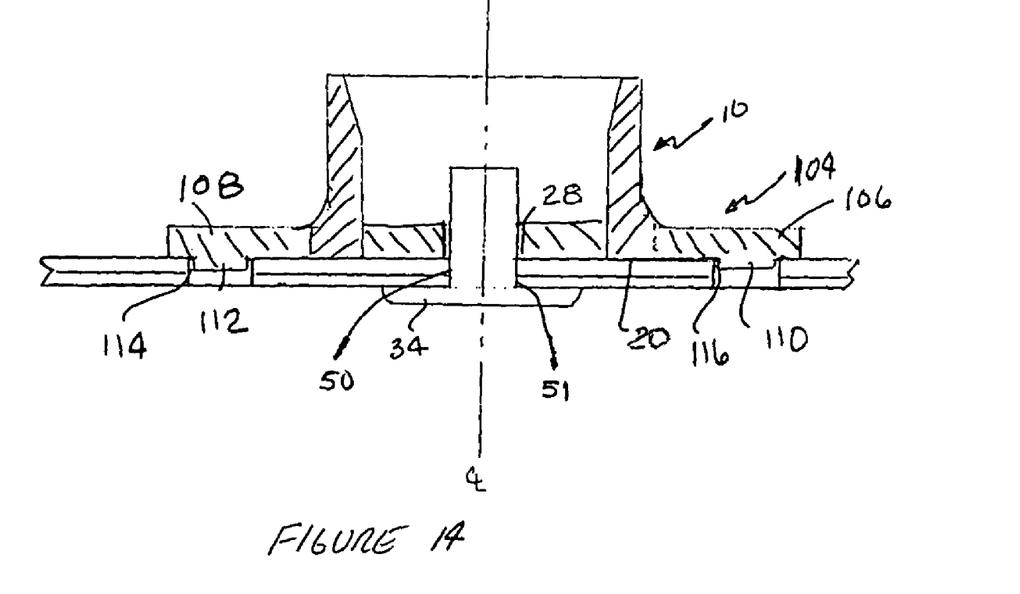
FIG. 14 is a cross-sectional view of the aligner that incorporates a placement guide.

Referring to FIG. 14, the aligner 10 may have a positioning guide 104. The positioning guide 104 may have appendages 106, 108, each having a protrusion 110, 112 extending outwardly therefrom (i.e., a direction away from the bottom 20 of the aligner 10). In operation, each protrusion 110, 112 may be placed within corresponding holes 114, 116 through which another staked fastener (not shown) will be placed. The protrusions 110, 112 are spaced one from the other a distance, which may be a function of the pitch of the holes into which rivets 34 will be placed, such that the bore 28 of the aligner 10 is aligned with the holes 50, 51 through which a rivet will be placed. It should be appreciated that the holes 114, 116 could be replaced by appropriately placed depressions.

Materials for the aligner are selected based on the application, as is the material for the rivet. The aligner permits the base and the housing to be made of the same or different materials to meet the needs of the fastener in the application.

Referring to the second and third embodiments, these embodiments generally contemplate a method of manufacture for the aligner 10 wherein the base 14 and the housing 12 are separately made then assembled. Thus, the base 14 is inserted into the housing 12 to create the aligner 10 sometime before use of the aligner.

It should also be appreciated that the aligner is but one part used in a staking operation. Thus, the aligner could be part of a kit of some combination of the other items disclosed herein.

While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention. Additionally, while the aligner has been depicted as round, this is not a requirement. In addition, while the channel and staking tools have been depicted as cylindrical, this is not a requirement. Additionally, the staked fastener has been depicted as a rivet, it should be appreciated that the aligner could be used with a post, which is similar to a rivet but lacks a second head. Additionally, the rivet has only been depicted as using the aligner to form the final head on the rivet. It is certainly possible to use the aligner to form the initial head as well, such as during the manufacturing of a rivet blank, i.e., the state a rivet is in prior to having the second head created. Also, the use of multiple reference numbers for an element, e.g., 10, 210, 310, is provided to assist the reader in understanding differences in embodiments and should only be relied upon in that context. Therefore, the absence of multiple reference numbers should not be presumed as a limitation. This list should not be considered exhaustive.

What is claimed is:

1. A method of staking a fastener comprising the steps of: providing a clinch portion of a staked fastener, placing the clinch portion in an aligner wherein the aligner has a housing defining a channel and a base defining a through bore, the clinch portion being placed in the channel through the through bore, the housing and base cooperating and dimensioned to accept, align and maintain alignment of a tip of a staking tool with the clinch portion as the tip travels within the channel during a staking operation, and staking the clinch portion by having the tip travel within the channel and contact the clinch portion and the base such that the base is disassociated from the aligner and retained by the staked fastener.

2. The method of claim 1 further including the step of wobbling the staking tool after staking the clinch portion.

3. The method of claim 1 wherein in the step of staking the clinch portion, the movement of the tip within the aligner is controlled by a stop positioned on the staking tool.

4. The method of claim 1 including the further step of securing the aligner with a hold-down tool.

5. The method of claim 4 wherein in the step of securing the aligner, the hold-down tool incorporates a handle.

6. The method of claim 4 wherein in the step of securing the aligner, the hold-down unit is attached to a staking tool.

7. A staking kit comprising: a staked fastener having a clinch portion, and an aligner for use with the staked fastener, the aligner having a housing defining a channel and a base defining a through bore, the clinch portion being placed in the channel through the through bore, the housing and base cooperating and dimensioned to accept, align and maintain alignment of a tip of a staking tool with the clinch portion as the tip travels within the channel during a staking operation, wherein the base is disassociated from the aligner and retained by the staked fastener.

8. The kit of claim 7 further including the tip of a staking tool.

9. The kit of claim 7 wherein the tip incorporates a stop.

10. The kit of claim 7 further including a hold-down tool.

11. The kit of claim 10 wherein the hold-down tool incorporates a pry.

12. The kit of claim 7 further including a pry.

13. The kit of claim 7 wherein the clinch portion and base are made from materials designed to meld during the staking operation.

14. The aligner of claim 1 wherein the bore is a through bore.

15. The method of claim 1 where in the step of placing the clinch portion in an aligner, the base is secured in the housing.

16. The staking kit of claim 7 wherein the base is secured in the housing.

* * * * *